United States Patent
He et al.

(10) Patent No.: US 12,367,005 B2
(45) Date of Patent: Jul. 22, 2025

(54) METHOD FOR DISPLAYING APPLICATION IMAGE, TERMINAL, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Xuan He, Guangdong (CN); Junzheng Yang, Guangdong (CN); Jiang Zhong, Guangdong (CN); Ruizhen Yu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 103 days.

(21) Appl. No.: 18/460,257

(22) Filed: Sep. 1, 2023

(65) Prior Publication Data

US 2023/0409273 A1 Dec. 21, 2023

Related U.S. Application Data

(63) Continuation of application No. PCT/CN2022/076227, filed on Feb. 14, 2022.

(30) Foreign Application Priority Data

Mar. 10, 2021 (CN) .......................... 202110262170.7

(51) Int. Cl.
*G06F 3/14* (2006.01)
*G06F 3/16* (2006.01)

(52) U.S. Cl.
CPC ............ *G06F 3/1454* (2013.01); *G06F 3/165* (2013.01)

(58) Field of Classification Search
CPC ............................... G06F 3/1454; G06F 3/165
See application file for complete search history.

(56) References Cited

U.S. PATENT DOCUMENTS

| | | | |
|---|---|---|---|
| 2010/0138780 A1 | 6/2010 | Marano et al. | |
| 2010/0235831 A1* | 9/2010 | Dittmer | G06F 9/45558 718/1 |

(Continued)

FOREIGN PATENT DOCUMENTS

| | | |
|---|---|---|
| CN | 109032485 A | 12/2018 |
| CN | 110286864 A | 9/2019 |

(Continued)

OTHER PUBLICATIONS

Bilibili video Demonstration, "Computer to play mobile games, play screen display," uploaded on Jul. 28, 2020 by user ID "Black Shark gaming phone," Retrieved from Internet:<https://www.bilibili.com/video/BV1Nt4y1D7QZ?from=search&seid=1844542335810014636>, screen-shots provided by the applicant's foreign counsel.

(Continued)

*Primary Examiner* — Kwang-Su Yang
(74) *Attorney, Agent, or Firm* — Ladas & Parry, LLP

(57) ABSTRACT

A method for displaying an application image, a terminal, and a non-transitory computer-readable storage medium are provided. The method is performed by the terminal and includes: acquiring application starting information of a redirection application running in the terminal; establishing a virtual display for the redirection application based on a target screen resolution of the redirection device configured to display the redirection application, the virtual display having the target screen resolution, and the virtual display being independent of a physical screen of the terminal; acquiring a redirection application image drawn for the virtual display, the redirection application image being an (Continued)

application image of the redirection application, and a resolution of the redirection application image matching the target screen resolution; and transmitting image data of the redirection application image to the redirection device to enable the redirection device to display the redirection application image based on the image data.

19 Claims, 11 Drawing Sheets

(56) References Cited

U.S. PATENT DOCUMENTS

| | | | |
|---|---|---|---|
| 2014/0082052 A1 | | 3/2014 | Kwon et al. |
| 2014/0240122 A1* | | 8/2014 | Roberts .................... G08B 3/10 340/539.11 |
| 2014/0308989 A1* | | 10/2014 | Tanaka .............. H04M 1/72409 455/557 |
| 2016/0188356 A1* | | 6/2016 | Ramasamy ............. G06F 9/452 718/1 |

FOREIGN PATENT DOCUMENTS

| | | |
|---|---|---|
| CN | 110347305 A | 10/2019 |
| CN | 111049980 A | 4/2020 |
| CN | 111221491 A | 6/2020 |
| CN | 111432070 A | 7/2020 |
| CN | 111857502 A | 10/2020 |
| CN | 112328941 A | 2/2021 |
| CN | 112333474 A | 2/2021 |
| CN | 112423076 A | 2/2021 |
| CN | 112905289 A | 6/2021 |
| WO | 2022188595 A1 | 9/2022 |

OTHER PUBLICATIONS

Black Shark Play Screen Projection (mobile screen projection computer software) v3.0 official free installation version (with usage instructions), published on Aug. 19, 2020, available at https://www.jb51.net/softs/741246.html.
Body feel control! Enjoy screen casting! More exciting moments on Tencent Black Shark gaming phone 3S, published on Jul. 30, 2020, available at https://www.sohu.com/a/410585031_120099885.
Black Shark Screen Projection Client v2.7.0, published on Aug. 27, 2019, available at https://www.idongdong.com/soft/140437.html.
Chinese First Office Action and search report in the corresponding Chinese Application No. 202110262170.7 issued on Sep. 5, 2022.
Chinese Rejection decision in the corresponding Application No. 202110262170.7 mailed Apr. 28, 2023.
International Search Report for International Application No. PCT/CN2022/076227 mailed Mar. 30, 2022.
Written Opinion of the International Searching Authority in International Application No. PCT/CN2022/076227 mailed Mar. 30, 2022 with machine English translation provided by foreign counsel and by WIPO.
Extended European Search Report issued on Jul. 22, 2024 for European Patent Application No. 22766121.2.

* cited by examiner

METHOD FOR DISPLAYING APPLICATION IMAGE, TERMINAL, AND NON-TRANSITORY COMPUTER-READABLE STORAGE MEDIUM

CROSS REFERENCE TO RELATED APPLICATIONS

The present disclosure is a continuation of International Patent Application No. PCT/CN2022/076227, filed Feb. 14, 2022, which claims priority to Chinese Patent Application No. 202110262170.7, filed Mar. 10, 2021, both of which are herein incorporated by reference in their entireties.

TECHNICAL FIELD

Embodiments of the present disclosure relate to the field of screen projection technologies, in particular to a method for displaying an application image, a terminal, and a non-transitory computer-readable storage medium.

BACKGROUND

Device screen projection is a redirection technology that transmits a screen mirroring image of a current device to another device, and the another device displays the screen mirroring image synchronously.

In a related art, when a device A is configured to project a screen image on a device B (generally, a screen size of the device B is larger than that of the device A), the device A transmits a screen mirroring image to the device B, and the device B displays the screen mirroring image after the device B enlarges the screen mirroring image in an equal proportion, so as to ensure a consistency of images displayed by the device B and the device A. In this way, any subsequent change of the image on the device A (such as starting an application from a desktop, switching applications, or jumping interfaces in an application, etc.) may be seen on the device B.

SUMMARY

In an aspect, a method for displaying an application image is provided and performed by a terminal. The method includes: acquiring application starting information of a redirection application, the redirection application being an application running in the terminal; establishing a virtual display for the redirection application based on a target screen resolution of the redirection device, the redirection device being a device configured to display the redirection application, the virtual display having the target screen resolution, and the virtual display being independent of a physical screen of the terminal; acquiring a redirection application image drawn for the virtual display, the redirection application image being an application image of the redirection application, and a resolution of the redirection application image matching the target screen resolution; and transmitting image data of the redirection application image to the redirection device to enable the redirection device to display the redirection application image based on the image data.

In another aspect, a terminal is provided and includes a processor and a memory. The memory stores at least one instruction used to be executed by the processor to implement the method for displaying the application image mentioned above.

In another aspect, a non-transitory computer-readable storage medium storing at least one instruction used to executed by a processor to implement the method for displaying the application image mentioned above.

DETAILED DESCRIPTION

In order to make the purpose, technical solution and technical effect of the present disclosure clear, some embodiments of the present disclosure will be further described in detail below in combination with the drawings.

In the present disclosure, a term "a plurality of" refers to two or more. A term "and/or" is an association relationship that describes association objects, indicating that there may be three kinds of relationships, for example, A and/or B may indicate that there are three cases: A alone, A and B together, and B alone. A character "/" generally indicates that front and back associated objects are an "or" relationship.

Figure 1:
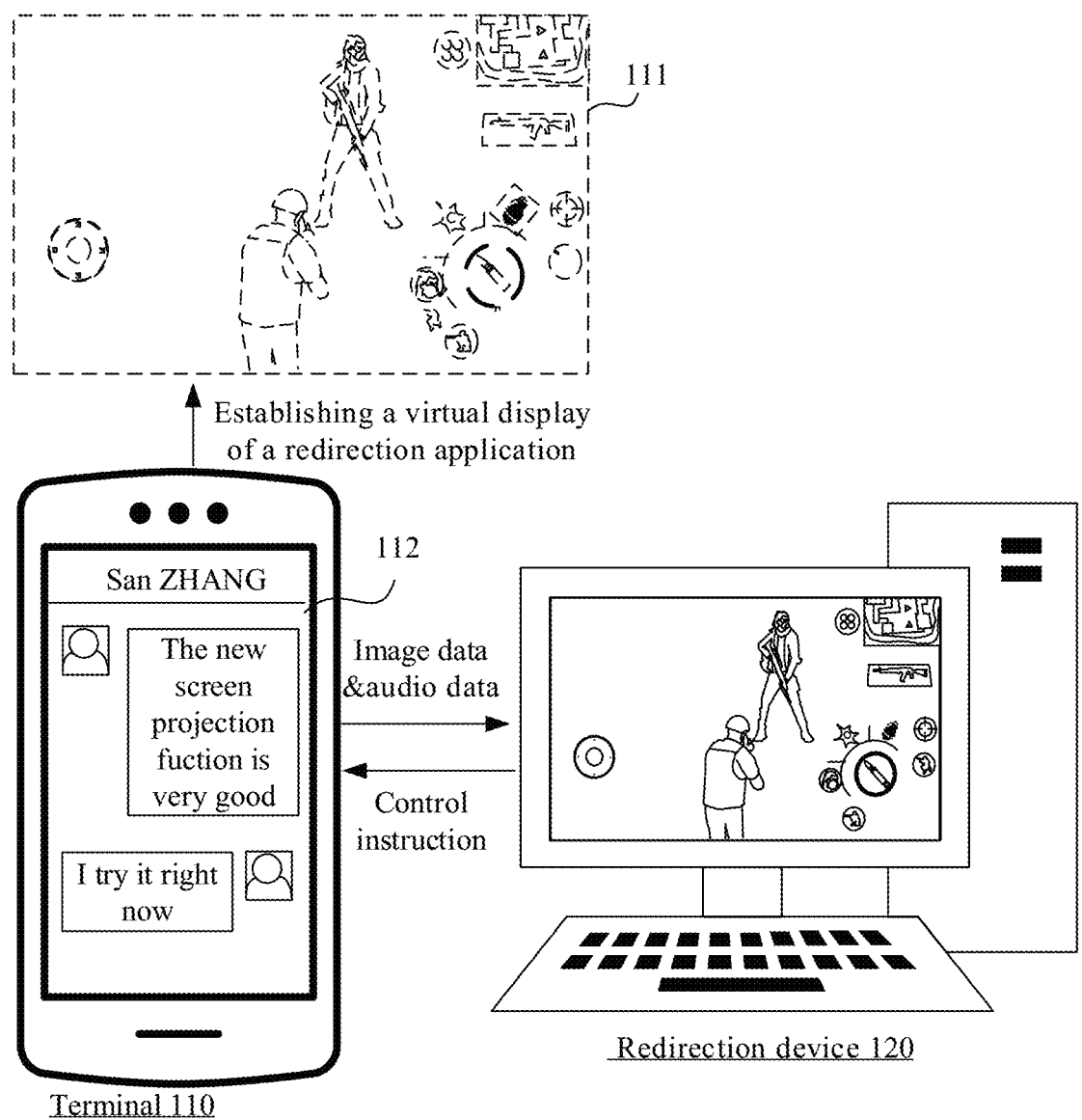
FIG. 1 is a schematic diagram of an implementation environment according to some embodiments of the present disclosure.

As shown in FIG. 1, FIG. 1 is a schematic diagram of an implementation environment according to some embodiments of the present disclosure. The implementation environment includes a terminal 110 and a redirection device 120.

The terminal 110 is an electronic device installed with a redirection application. The redirection application may be an instant messaging application, a social intercourse application, a video playing application or a game application.

The electronic device may be a smart phone, a tablet computer or a personal computer, etc. (the terminal 110 being a smart phone is taken as an example in FIG. 1). Embodiments of the present disclosure does not limit types of the redirection application and the electronic device.

A wired redirection connection or a wireless redirection connection is established between the terminal 110 and the redirection device 120. In some embodiments, the terminal 110 and the redirection device 120 may establish the wired redirection connection through a data wire. In some embodiments, the terminal 110 and the redirection device 120 may establish the wireless redirection connection by accessing a same network (data interaction is performed through a wireless access point in the network).

In some embodiments, both the terminal 110 and the redirection device 120 are installed with a screen projection application. After the terminal 110 and the redirection device 120 run the screen projection application, the redirection connection may be established between the terminal 110 and the redirection device 120 through the screen projection application.

The redirection device 120 is an electronic device configured to display an application image corresponding the redirection application (the redirection application is not installed in the electronic device). The electronic device may be an intelligent TV, a projection device, a vehicle terminal, a personal computer, a portable computer, or the like (the redirection device 120 being a personal computer is taken as an example in FIG. 1). In some embodiments, a screen size of the redirection device 120 is larger than that of the terminal 110, so as to implement a better display effect in a screen projection process.

In some embodiments, in order to enable the application image of the redirection application to adapt to a resolution of the redirection device 120 to avoid large black edges caused by scaling the application image in an equal proportion, when the redirection application is needed to be projected and displayed, the terminal 110 establishes a virtual display 111 for the redirection application (different from a resolution of a physical screen 112 of the terminal 110) base on a screen resolution of the redirection device 120 before starting the redirection application, such that the redirection application may draw a redirection application image for the virtual display 111 (instead of the physical screen 112).

Further, the terminal 110 transmits image data and audio data (i.e., redirection data) of the redirection application to the redirection device 120 through the redirection connection for displaying image and playing audio by the redirection device 120.

When implementing the above application-level screen projection, the terminal 110 may be equivalent to a host, and the redirection device 120 may be equivalent to a display. The application image drawn by the redirection application is displayed in the virtual display 111, therefore, when the redirection device 120 displays the redirection application image, the physical screen 112 of the terminal 110 may display an application image of other application except the redirection application image drawn by the redirection application.

As shown in FIG. 1, the redirection device 120 displays a game interface of a game application while the physical screen 112 of the terminal 110 displays a chat interface of an instant messaging application, the two applications do not affect each other. When a device-level projection scheme is adopted, a screen mirroring image of the terminal is transmitted to the redirection device, such that the images displayed by the terminal and the redirection device are exactly same, and any image changes of the terminal (such as starting an application from a desktop, switching applications, or jumping interfaces in an application, etc.) are all projected on the redirection device. It is impossible to use different applications in the terminal and redirection device at the same time.

In some embodiments, the redirection device 120 may also include an input component including a touch screen, a touch pad, a keyboard, a mouse, a rocker, and so on, which is not limited. During a process of the redirection device 120 displaying the redirection application image, the user may control an element in the redirection application image through the input component on the redirection device side 120, and transmit a control instruction triggered by the input component to the terminal 110 through the redirection connection, such that the terminal 110 may simulate an effect of the user controlling the redirection application through the terminal 110 based on the control instruction.

As shown in FIG. 1, when the user controls a movement of a virtual character in the redirection application image through a keyboard of the redirection device 120, the redirection device 120 transmits the control instruction triggered by the keyboard to the terminal 110, and the terminal 110 responds to the control instruction to control the movement of the virtual character.

Figure 2:
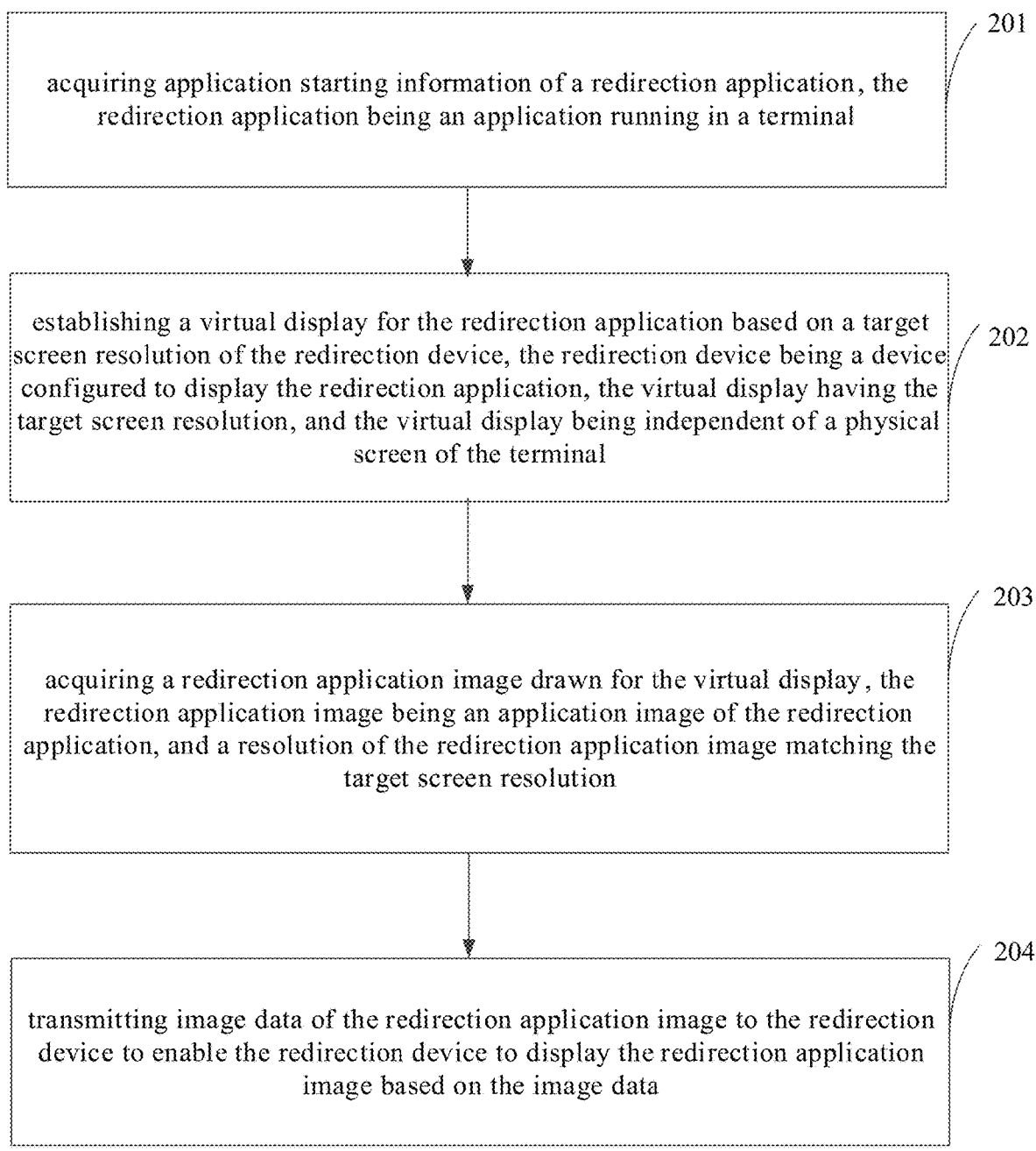
FIG. 2 is a flowchart of a method for displaying an application image according to some embodiments of the present disclosure.

As shown in FIG. 2, FIG. 2 is a flowchart of a method for displaying an application image according to some embodiments of the present disclosure. Some embodiments take the method for the terminal shown in FIG. 1 as an example, and the method includes following operations.

At operation 201, acquiring application starting information of a redirection application, the redirection application being an application running in a terminal.

In some embodiments, the application starting information is acquired locally by the terminal (that is, the user indicates to start the redirection application on the terminal side). In some embodiments, the application starting information is acquired from the redirection device by the terminal (that is, the user indicates to start the redirection application on the redirection device side), and the redirection device is a device configured to display the redirection application.

In some embodiments, the application starting information includes an application package name of the redirection application, and the terminal determines the redirection application to be started according to the application package name.

In some embodiments, after the terminal acquires the application starting information, it detects whether the redirection application is installed. If the redirection application is installed, the terminal performs following operation 202. If the redirection application is not installed, the terminal performs operation 202 after the redirection application is installed.

At operation 202, establishing a virtual display for the redirection application based on a target screen resolution of the redirection device, the redirection device being a device configured to display the redirection application, the virtual display having the target screen resolution, and the virtual display being independent of a physical screen of the terminal.

The screen resolutions of the terminal and the redirection device may be different (for example, screen resolution ratios are different). When an application image displayed on the physical screen on the terminal side is directly scaled and transmitted to the redirection device, large black edges will appear (the black edges are located on the upper and lower sides of the application image) when the scaled application image is displayed on the redirection device side, which will reduce user's visual experience.

Therefore, in order to enable the application image displayed on the redirection device side to match the screen resolution of the redirection device to avoid the large black edges, in some embodiment of the present disclosure, the terminal establishes a virtual display for the redirection application, the virtual display is consistent with the screen resolution of the redirection device, and the virtual display is subsequently used to display the application image of the redirection application. An establishment manner of the virtual display is detailed in following embodiments.

The target screen resolution of the virtual display may be different from the resolution of the physical screen of the terminal. For example, the physical screen resolution of the terminal is 2340*1080 (13:6), while the target screen resolution of the virtual display is 1920*1080 (16:9).

Since the virtual display is independent of the physical screen of the terminal, the physical screen of the terminal will not display the application image of the redirection application (similar to running the redirection application in a background) during a process of the redirection application running. Therefore, in some embodiments, the physical screen of the terminal may be in a screen-off state, in some embodiments, the physical screen of the terminal may start and display an application image of other application.

At operation 203, acquiring a redirection application image drawn for the virtual display, the redirection application image being an application image of the redirection application, and a resolution of the redirection application image matching the target screen resolution.

During a process of the redirection application running, the redirection application draws the redirection application image for the virtual display. The resolution of the redirection application image is different from that of an application image drawn for the physical screen.

For example, the redirection application is a game application. When the resolution of the physical screen of the terminal is 2340*1080, and a game image of the game application is displayed on the physical screen, the resolution of the game image drawn by the game application is 2340*1080. When the terminal needs to project the game application image on the redirection device, and the target screen resolution of the redirection device is 1920*1080, the resolution of the game image drawn by the game application is 1920*1080.

The resolution of the redirection application image matching the target screen resolution may include following situations: 1. the resolution of the redirection application image being same as that of the target screen; 2. the resolution ratio of the redirection application image being same as that of the target screen (for example, the resolution of the redirection application image is 1920*1080 while the target screen resolution is 3940*2160, the resolution ratios are 16:9); 3. the resolution ratios of the redirection application image and the target screen being different (for example, the resolution ratio of the redirection application image is 16:9 while the resolution ratio of the target screen is 16:10, and a ratio of the two resolution ratios is 1.1).

In some embodiments, the terminal acquires the redirection application image drawn by the redirection application for the virtual display according to a preset sampling frequency (60 FPS or 120 FPS), so as to transmit the redirection application image to the redirection device later. For an application image currently displayed on the physical screen of the terminal, the terminal will not acquire an application image drawn for the physical screen.

At operation 204, transmitting image data of the redirection application image to the redirection device to enable the redirection device to display the redirection application image based on the image data.

In some embodiments, the terminal encodes the acquired redirection application image to acquire the encoded image data, so as to transmit the image data to the redirection device in a form of a video stream. Correspondingly, the redirection device decodes the received image data, so as to restore and display the redirection application image.

Compared with directly transmitting original image data of the redirection application image to the redirection device, encoding the image data of the redirection application image facilitates reducing an amount of data transmission, thereby reducing a transmission delay of image data (such as reducing a transmission delay of transmitting data through wireless redirection connection) and a display delay of the redirection device.

In conclusion, in some embodiments of the present disclosure, when the terminal needs to display the redirection application through the redirection device, based on the target screen resolution of the redirection device, the terminal establishes the virtual display independent of the physical screen for the redirection application and draws the redirection application image matching the target screen resolution for the virtual display, so as to transmit the image data of the redirection application image to the redirection device for display by the redirection device. Compared with the device-level projection scheme in the related art, some embodiments of the present disclosure adopt the application-level projection scheme, which may enable the resolution of the redirection application image to adapt to the resolution of the redirection device to avoid large black edges caused by scaling the image in an equal proportion when the redirection device displays, thereby further improving a display effect of screen projection.

In some embodiments, the terminal runs a Redirection-Server.

The establishing a virtual display for the redirection application based on a target screen resolution of the redirection device may include: transmitting a virtual display establishment request to a DisplayManagerServer through the RedirectionServer, the virtual display establishment request including the target screen resolution, the DisplayManagerServer being configured to establish the virtual display for the redirection application based on the target screen resolution.

In some embodiments, after establishing a virtual display for the redirection application based on a target screen resolution of the redirection device, the method may include: transmitting an activity running message to an ActivityManagerServer by the RedirectionServer, the activity running message including display information of the virtual display, the ActivityManagerServer being configured to indicate the redirection application to establish a target activity based on the activity running message, the target activity being configured to request a WindowManagerServer to establish a target window, the WindowManagerServer being configured to request to establish a target image layer for the target window, and the target image layer being configured to receive the redirection application image.

The acquiring a redirection application image drawn for the virtual display may include: acquiring the redirection application image drawn for the virtual display from the target image layer through the RedirectionServer.

In some embodiments, the redirection application includes candidate image display resources corresponding to at least two candidate screen resolutions. Before the acquiring a redirection application image drawn for the virtual display, the method may include: determining a target image display resource matching the target screen resolution through the redirection application, and drawing the redirection application image based on the target image display resource.

In some embodiments, the establishing a virtual display for the redirection application based on a target screen resolution of the redirection device may include: in response to existing n redirection applications, establishing n virtual displays for the n redirection applications based on the target screen resolution, n being an integer greater than 1, and different redirection applications corresponding to different virtual displays.

In some embodiments, the acquiring application starting information of a redirection application may include: displaying an application selection interface including at least one candidate application, determining a selected candidate application as the redirection application in response to a selection operation on the application selection interface, and acquiring the application starting information of the redirection application; or receiving the application starting request transmitted by the redirection device, the application starting request including the application starting information of the redirection application, the application starting request being transmitted by the redirection device when the redirection device receives a selection operation on an application selection interface including at least one the candidate application.

In some embodiments, the method may also include: displaying an application image of an application indicated by an application starting operation on a physical screen in response to the application starting operation outside the application selection interface.

In some embodiments, after the transmitting image data of the redirection application image to the redirection device, the method may include: displaying an application notification message on physical screen in response to receiving the application notification message not corresponding a redirection application.

In some embodiments, before the acquiring application starting information of a redirection application, the method may include: establishing a wired redirection connection with the redirection device; and acquiring the target screen resolution of the redirection device through the wired redirection connection; or acquiring a network address of the redirection device, the terminal and the redirection device being accessing a same network; establishing a wireless redirection connection with the redirection device based on the network address; and acquiring the target screen resolution of the redirection device through the wireless redirection connection.

In some embodiments, the method may include: acquiring audio data of the redirection application; and transmitting the audio data to the redirection device to enable the redirection device to play an application audio of the redirection application based on the audio data.

In some embodiments, after the transmitting image data of the redirection application image to the redirection device, the method may include: receiving a first control instruction transmitted by the redirection device, the first control instruction being acquired by the redirection device switching a second control instruction, the second control instruction being an instruction triggered by an input component on the redirection device side, and the first control instruction being used to simulate an instruction triggered by an input component on the terminal side; and controlling the redirection application based on the first control instruction.

Figure 3:
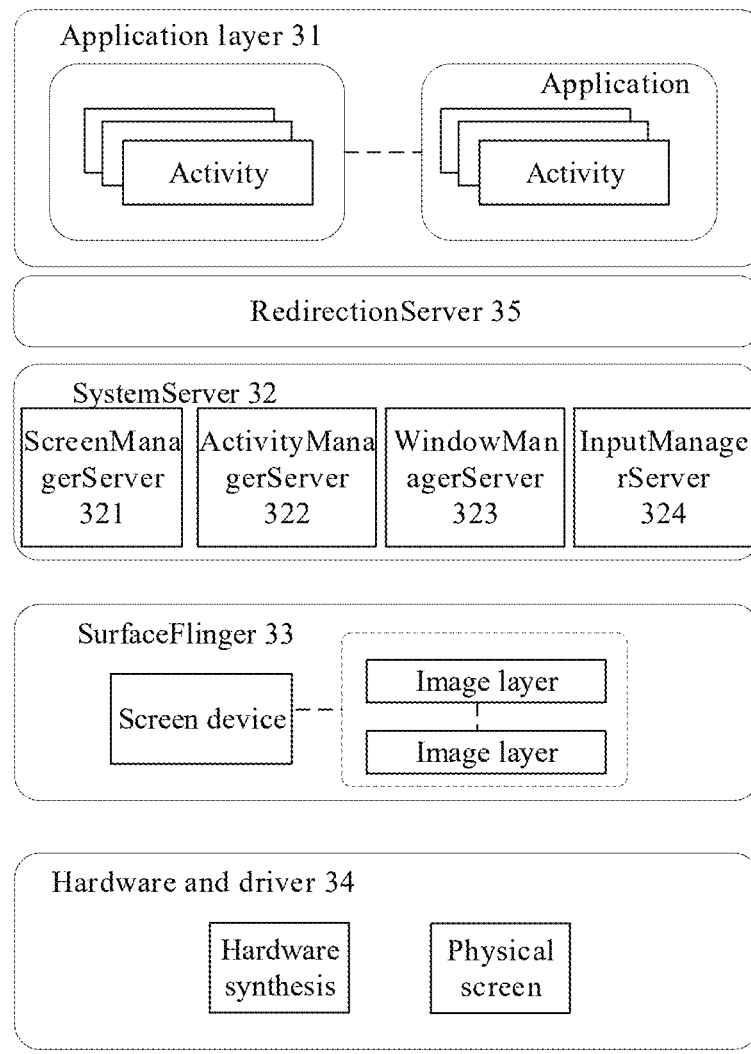
FIG. 3 is a schematic diagram a structure of a system according to some embodiments of the present disclosure.

In some embodiments, as shown in FIG. 3, besides an application layer 31, a SystemServer 32, a SurfaceFlinger 33, and a hardware and driver 34, the terminal system includes a RedirectionServer 35 arranged under the application layer 31. During the redirection process, the RedirectionServer 35 first establishes a virtual display through a DisplayManagerServer 321 in the SystemServer 32, establishes an activity corresponding to the redirection application through an ActivityManagerServer 322, and establishes a corresponding window through a WindowManagerServer 323. Moreover, since the application image needs to be redirected to the virtual display, it is necessary to request SurfaceFlinger 33 to establish a corresponding image layer to receive the redirection application image synthesized in a unit of a display component.

In addition, during the redirection process, the RedirectionServer 35 may also be configured to receive a control instruction transmitted by the redirection device (triggered by the input component on the redirection device side), and respond to the control instruction through an InputManagerServer 324 in the SystemServer 32. Moreover, during the redirection process, the hardware and driver 34 may synthesize and display the application image on the physical screen through a hardware.

The following describes the redirection process in detail with some embodiments.

Figure 4:
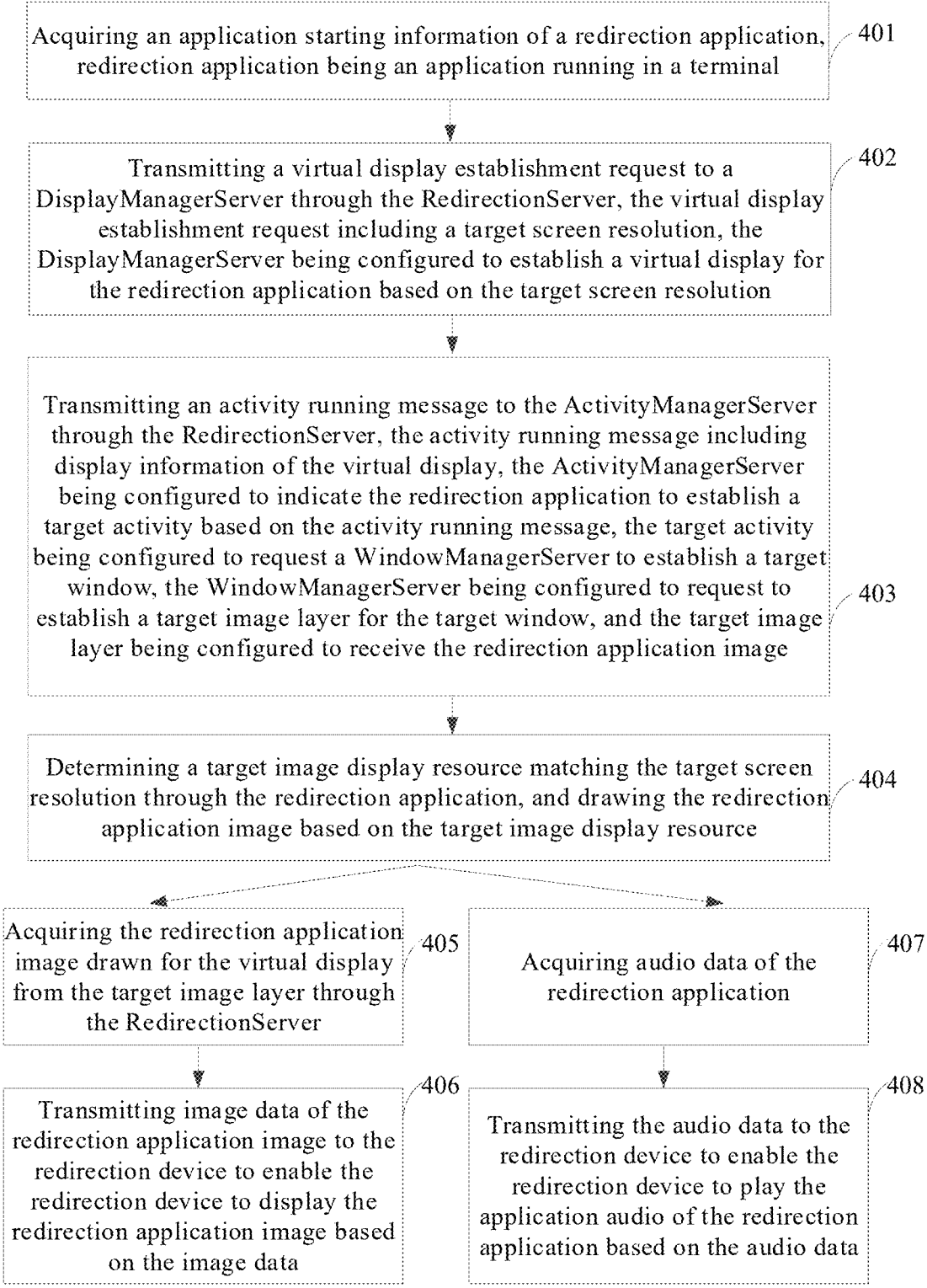
FIG. 4 is a flowchart of a method for displaying an application image according to some embodiments of the present disclosure.

As shown in FIG. 4, FIG. 4 is a flowchart of a method for displaying an application image according to some embodiments of the present disclosure. Some embodiments take the method for the terminal shown in FIG. 1 as an example, and the method includes following operations.

At operation 401, acquiring an application starting information of a redirection application, redirection application being an application running in a terminal.

In some embodiments, both the terminal and the redirection device are installed with a screen projection application, and the user may start the redirection application through the screen projection application installed with the terminal or the redirection application.

In some embodiments, when the redirection application is started through the projection application installed with the terminal, the terminal displays an application selection interface including at least one candidate application, and the candidate application includes the application installed with the terminal and applications not installed with the terminal. In response to the selection operation on the application selection interface, the terminal determines a selected candidate application as the redirection application, and acquires an application starting information of the redirection application.

Figure 5:
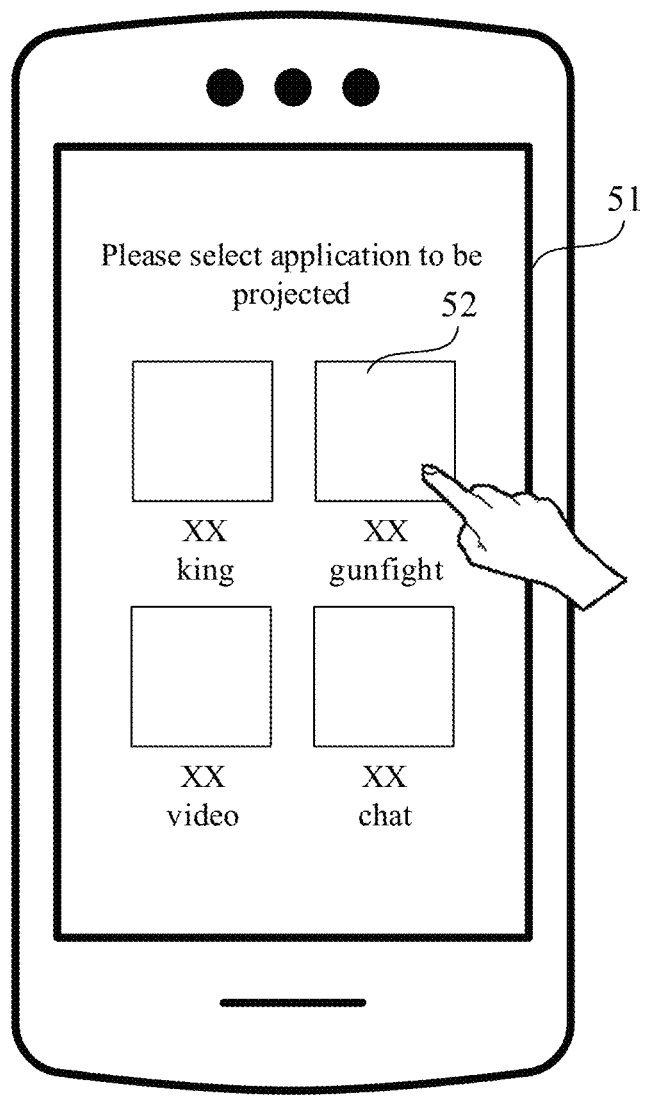
FIG. 5 is a schematic diagram of an interface of a process of a terminal triggering and starting a redirection application according to some embodiments of the present disclosure.

In some embodiments, as shown in FIG. 5, an application selection interface 51 of a screen projection application of terminal side displays application icons 52 corresponding to several candidate applications. When receiving the selection operation of the application icon corresponding to "xx gunfight", the terminal determines the "xx gunfight" as a redirection application, and acquires an application package name corresponding to the "xx gunfight".

In some embodiments, when the redirection application is started through the projection application installed with the redirection device, the redirection application displays an application selection interface including at least one candidate application. When receiving the selection operation on the application selection interface, the redirection device determines a selected candidate application as the redirection application, and acquires the application starting information of the redirection application. Further, the redirection device transmits an application starting request including the application starting information to the terminal, and indicates the terminal to start the redirection application.

Figure 6:
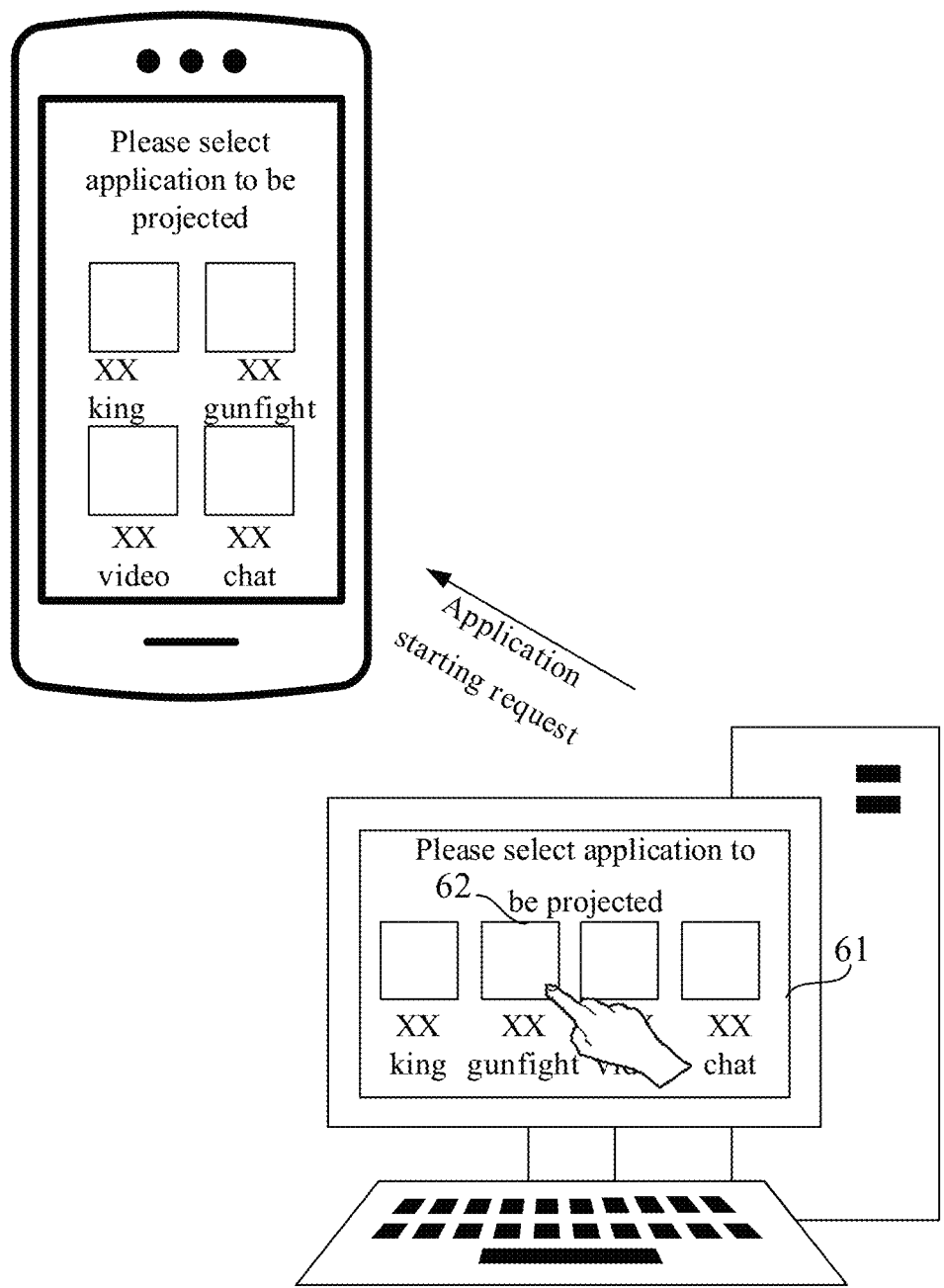
FIG. 6 is a schematic diagram of an interface of a process of a redirection device triggering and starting a redirection application according to some embodiments of the present disclosure.

As shown in FIG. 6, in some embodiments, application icons 62 corresponding to several candidate applications are displayed in an application selection interface 61 of the projection application of the redirection device side. When receiving the selection operation of the application icon corresponding to "xx gunfight", the redirection device acquires application starting information such as an application package name of "xx gunfight", and transmits an application starting request including the application starting information to the terminal through the redirection connection.

Figure 7:
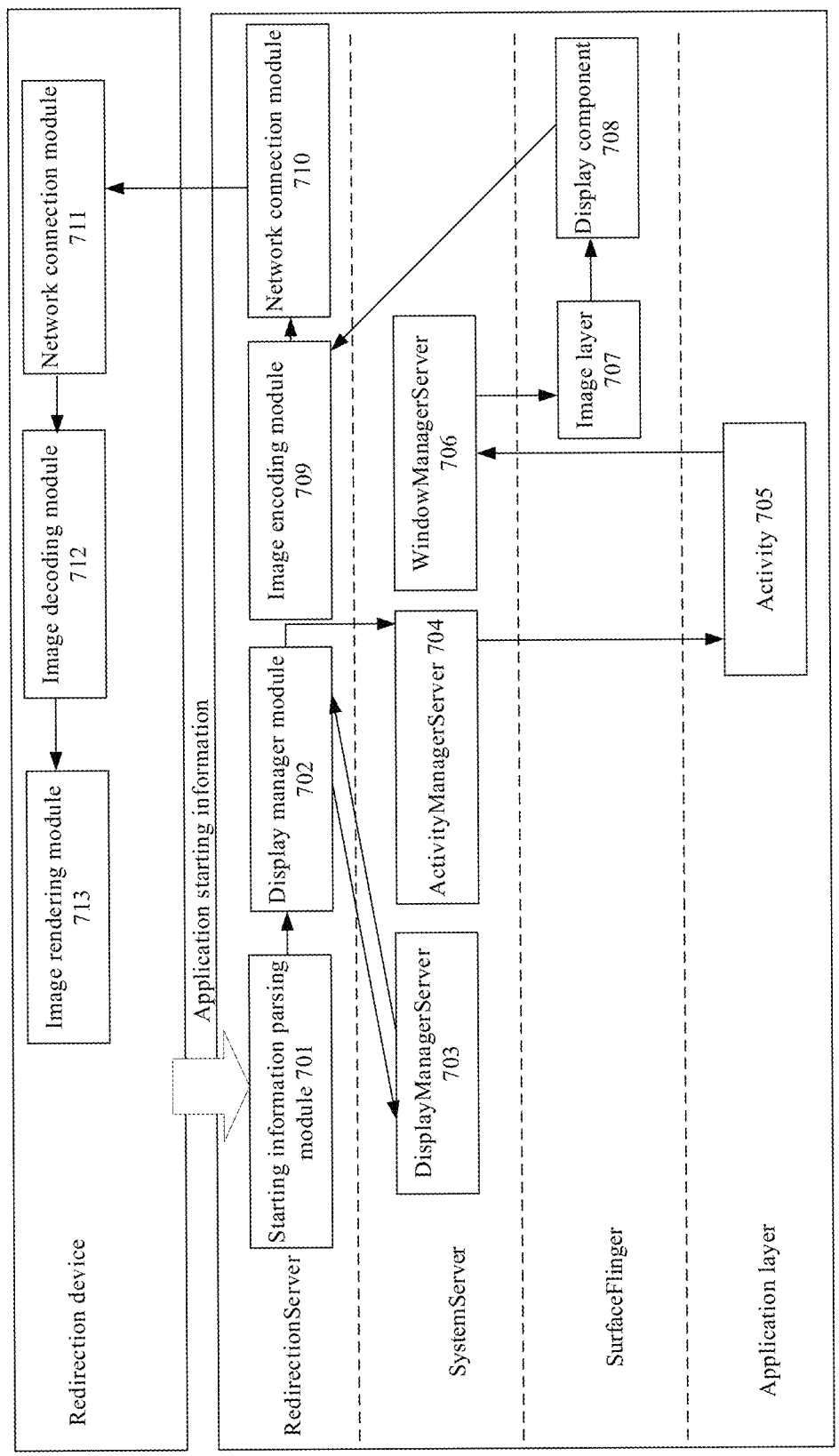
FIG. 7 is a schematic diagram a process of displaying an application image according to some embodiments of the present disclosure.

In some embodiments, as shown in FIG. 7, after the RedirectionServer in the terminal acquires the application starting information, it parses the application starting information through a starting information parsing module 701, acquires application starting information of an Activity, and encapsulates the information into a format specified by a system for subsequently starting the Activity.

At operation 402, transmitting a virtual display establishment request to a DisplayManagerServer through the RedirectionServer, the virtual display establishment request including a target screen resolution, the DisplayManagerServer being configured to establish a virtual display for the redirection application based on the target screen resolution.

Servers provided by the SystemServer in the terminal include a DisplayManagerServer configured to manage a displayed life cycle. In some embodiments of the present disclosure, application-level screen projection is needed to implement, therefore, in some embodiments, the RedirectionServer establishes a virtual display for the redirection application by requesting the DisplayManagerServer before starting the redirection application. When requesting to establish a virtual display, the request transmitted by the RedirectionServer to the DisplayManagerServer includes the target screen resolution of the redirection device.

Correspondingly, after receiving the request, the DisplayManagerServer establishes the virtual display with the target screen resolution and feeds the virtual display back to the RedirectionServer.

In some embodiments, as shown in FIG. 7, the RedirectionServer transmits a request for establishing a virtual display to a DisplayManagerServer 703 through a display manager module 702. After the DisplayManagerServer 703 establish the virtual display, it feeds the established virtual display back to the display manager module 702.

At operation 403, transmitting an activity running message to the ActivityManagerServer through the RedirectionServer, the activity running message including display information of the virtual display, the ActivityManagerServer being configured to indicate the redirection application to establish a target activity based on the activity running message, the target activity being configured to request a WindowManagerServer to establish a target window, the WindowManagerServer being configured to request to establish a target image layer for the target window, and the target image layer being configured to receive the redirection application image.

After the virtual display is established, the RedirectionServer starts the redirection application based on the application starting information. In some embodiments, the redirection application image is not displayed on the physical screen, after the RedirectionServer acquires the virtual display, it needs to transmit the activity running message including the display information corresponding to the virtual display to the ActivityManagerServer to ensure that the redirection application image is redirected to the virtual display instead of the default physical screen. The display information may be a display identifier of the virtual display. When there are a plurality of virtual displays, different virtual displays correspond to different display identifiers respectively.

After receiving the activity running message, the ActivityManagerServer will indicate the redirection application of an application layer to establish the target activity according to the activity running message, and the established target activity requests the WindowManagerServer to request the SurfaceFlinger to establish the target image layer for the target window (different from receiving an image layer of an image corresponding to a physical screen), so as to receive the redirection application image drawn for the virtual display through the target image layer later.

In some embodiments, as shown in FIG. 7, after acquiring the virtual display, the display manager module 702 adds the display information of the virtual display in an activity running request, and transmits the activity running request to an ActivityManagerServer 704, and the ActivityManagerServer 704 requests the redirection application of the application layer to establish an activity 705. After the activity 705 is established, it requests a WindowManagerServer 706 to establish a target window. After a WindowManagerServer 706 establishes the window, it requests a SurfaceFlinger to establish an image layer 707 for the target window, such that the SurfaceFlinger may draw and synthesize the redirection application image on the image layer 707 based on the display component 708 (i.e., the virtual display in some embodiments of the present disclosure) as a unit.

At operation 404, determining a target image display resource matching the target screen resolution through the redirection application, and drawing the redirection application image based on the target image display resource.

During a process of drawing the redirection application image, in order to adapt to terminals with different resolutions, at least two candidate image display resources corresponding to candidate screen resolutions are included in the redirection application (application images drawn based on different image display resources show different display effects, such as a wider image perspective). The image display resource may include an image resource and a control layout file resource, etc. Since the display information of the virtual display is transmitted to the redirection application during starting the application, the redirection application may determine the target image display resource matching the target screen resolution (from the candidate screen resolution) based on the display information, so as to draw the redirection application image based on the target image display resource and improve the display effect of the application image in the redirection device.

In some embodiments, when there is a candidate screen resolution same as the target screen resolution (for example, both of the resolutions are 1920*1080), a candidate image display resource corresponding to the candidate screen resolution is determined as the target image display resource.

When there is no candidate screen resolution same as the target screen resolution, while there is a resolution ratio of a candidate screen resolution same as a resolution ratio of the target screen resolution (for example, both of the resolution ratios are 16:9), the candidate image display resource corresponding to the candidate screen resolution is determined as the target image display resource.

When there is no resolution ratio of a candidate screen resolution same as the resolution ratio of the target screen resolution, a resolution ratio of a candidate screen resolution closest to the resolution ratio of the target screen resolution is determined, and a candidate image display resource corresponding to the candidate screen resolution is determined as the target image display resource.

In some embodiments, during a process of the redirection application drawing the redirection application image, the SurfaceFlinger is notified that there is image layer update through the target activity, and the SurfaceFlinger synthesizes the redirection application image in the established target image layer based on the display component as a unit.

For example, the redirection application is a game application, and includes image display resources corresponding to resolutions of 1920*1080, 2340*1080, and 1080*720. When a game image is displayed directly through the physical screen of the terminal, since the resolution of the physical screen is a resolution of 2340*1080, the game application uses the image display resource corresponding to a resolution of 2340*1080 to draw a game image. When the game image is projected through a redirection device with a screen resolution of 1920*1080, the game application uses the image display resources corresponding to a resolution of 1920*1080 to draw the game image.

At operation 405, acquiring the redirection application image drawn for the virtual display from the target image layer through the RedirectionServer.

Since the target image layer for receiving the redirection application image is set, the RedirectionServer may acquire the redirection application image from the target image layer. In some embodiments, the RedirectionServer encodes the acquired redirection application image, and subsequently transmits the encoded image data to the redirection device.

In some embodiments, as shown in FIG. 7, an image encoding module 709 in the RedirectionServer acquires the redirection application image from a display component 708, and encodes the redirection application image.

At operation 406, transmitting image data of the redirection application image to the redirection device to enable the redirection device to display the redirection application image based on the image data.

An implementation of this operation may be referred to the above operation 204, which will not be repeated here.

In some embodiments, as shown in FIG. 7, the image encoding module 709 outputs and transmits the image to a network connection module 710, and the network connection module 710 on the terminal side transmits the image data to a network connection module 711 on the redirection device side. After receiving the image data, the redirection device decodes the image data through an image decoding module 712 to acquire the redirection application image, and then renders and displays the redirection application image through an image rendering module 713.

At operation 407, acquiring audio data of the redirection application.

In order to avoid an application audio of other application or a system audio running on the terminal side from interfering with the redirection application, in some embodiments, while the RedirectionServer acquires the redirection application image, it separates audios of the terminal audio to acquire the audio data of the redirection application.

At operation 408, transmitting the audio data to the redirection device to enable the redirection device to play the application audio of the redirection application based on the audio data.

Further, the terminal transmits the audio data to the redirection device through the redirection connection, and the redirection device plays the application audio of the redirection application (the terminal does not play the audio of the redirection application), so as to implement independent output of application audios on the terminal and the redirection device without mutual interference.

In some embodiments, when transmitting the image data and the audio data, the terminal needs to synchronize them (such as setting a synchronization timestamp) to ensure synchronization of audio and image on the redirection device side.

In some embodiments, the terminal requests the RedirectionServer to establish the virtual display through the DisplayManagerServer before starting the redirection application, and adds the display information of the virtual display to the activity running massage used to start the application, such that the redirection application may use the image display resource matching the screen resolution corresponding to the virtual display to draw the application image, thereby improving an accuracy of drawing the redirection image.

In addition, in some embodiments, the terminal implements separating the application audio on the redirection device side from application audios on the terminal by acquiring the audio data corresponding to the redirection application and transmitting the audio data to the redirection device, so as to avoid other audios on the terminal from interfering with the audio of the redirection application.

In the above embodiments, the terminal starting a single redirection application is taken as an example. In some embodiments, when starting n redirection applications (such as starting n times), the terminal establishes different virtual displays for different redirection applications based on target screen resolution of the redirection device, that is, the terminal establishes n virtual displays. Correspondingly, each virtual display corresponds to its own window and layer. After the terminal transmits the redirection application image corresponding to each redirection application to the redirection device, the redirection device may switch a plurality of redirection application images to process different tasks. This embodiment will not be repeated here.

The virtual display is used only by the redirection application. Therefore, when the terminal receives the application starting operation outside the application selection interface, the application starting operation will not affect the redirection application image displayed by the redirection device, but the terminal will display an application image of the application indicated by the application starting operation on a physical screen.

For example, after the user selects to start "xx gunfight" in the application selection interface of the screen projection application of terminal side, the redirection device displays a game interface of the "xx gunfight", while the physical screen of the terminal continues to display the application selection interface. When the user switches the screen projection application to the background and clicks an application icon corresponding to "xx chat" on a system desktop, the terminal displays a chat interface of the "xx chat", while the redirection device continues to display the game interface of the "xx gunfight". The user may chat which the user is playing the game, the two applications do not interfere with each other, and the user do not need to switch between the two applications on a same device.

In addition, in another scenario, when the terminal receives an application notification message, it detects an application corresponding to the application notification message. When the application is not a redirection application, the application notification message will not be displayed in the redirection application image, but the application notification message will be displayed by the terminal on the physical screen.

Figure 8:
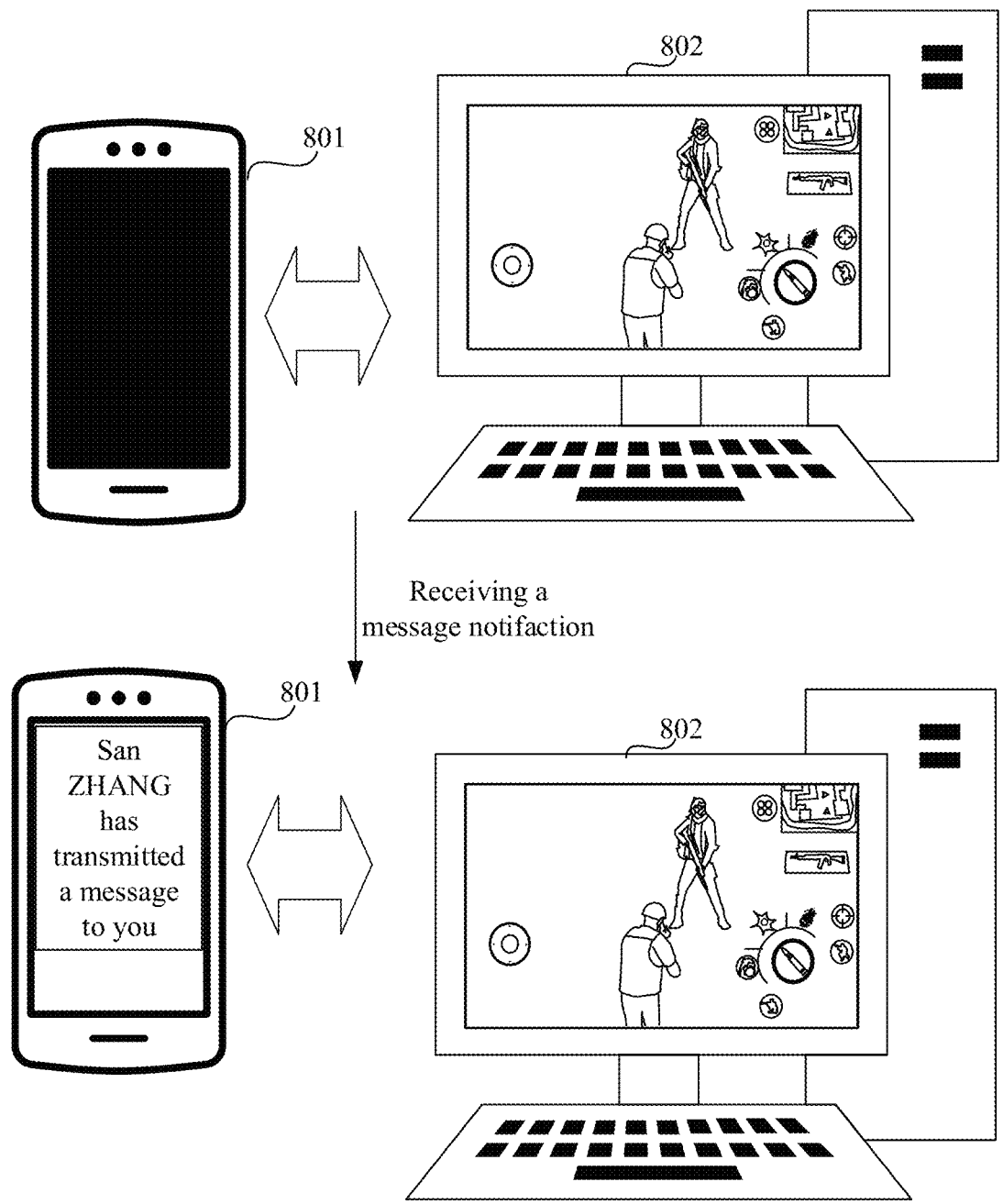
FIG. 8 is a schematic diagram of an interface of displaying an application notification message during a process of a screen projection according to some embodiments of the present disclosure.

For example, as shown in FIG. 8, after the user selects to start "xx gunfight" in the application selection interface of the screen projection application on the terminal 801, the redirection device 802 displays a game interface of the "xx gunfight". In order to reduce the power consumption of the terminal, the user turns off the screen of the terminal 801. When "xx chat" in the terminal 801 receives a notification message, the terminal 801 turns on the screen and displays the notification message, while the redirection device 802 continues to display a game interface of the "xx gunfight", so as to avoid the interference caused by the notification message of non-redirection application, and improve an immersive experience during the process of screen projection.

As for a manner to establish a redirection connection between the terminal and the redirection device, in some embodiments, when the terminal establishes a wired redirection connection with the redirection device through a data wire, correspondingly, the terminal acquires the target screen resolution of the redirection device through the wired redirection connection.

In some embodiments, when the terminal and the redirection device are connected through a data wire, and both the terminal and the redirection device start the screen projection application, the screen projection application will establish the wired redirection connection between the terminal and the redirection device.

In some embodiments, when the terminal and the redirection device access a same network, the terminal acquires a network address of the redirection device in the network, so as to establish a wireless redirection connection with the redirection device based on the network address. Correspondingly, the terminal acquires the target screen resolution of the redirection device through the wireless redirection connection. The network information may be an IP address of the redirection device in the network.

In some embodiments, the network address of the redirection device may be acquired by manual input. In some embodiments, the redirection device generates and displays a graphic code (such as a two-dimensional code) including the network address, and the terminal scans and parses the graphic code to acquire the network address.

Figure 9:
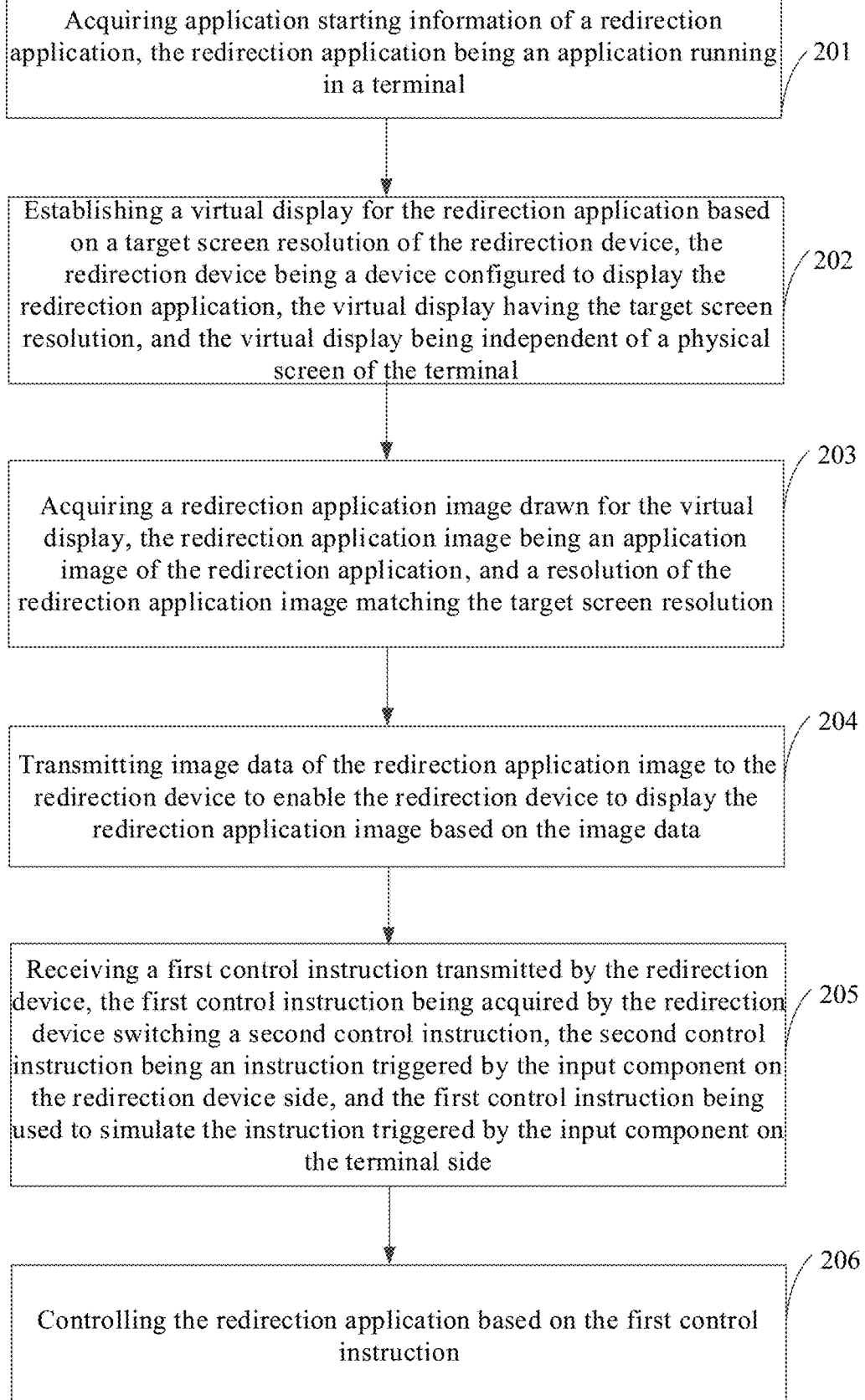
FIG. 9 is a flowchart of a method for displaying an application image according to some embodiments of the present disclosure.

In some embodiment of the present disclosure, the redirection device has not only the display function, but also a control function for the redirection application. The control function may be implemented through the input component of the redirection device including a keyboard, a mouse, a touch pad, a touch display screen, or a rocker, etc. On the basis of FIG. 2, as shown in FIG. 9, the method includes following operations after operation 204.

At operation 205, receiving a first control instruction transmitted by the redirection device, the first control instruction being acquired by the redirection device switching a second control instruction, the second control instruction being an instruction triggered by the input component on the redirection device side, and the first control instruction being used to simulate the instruction triggered by the input component on the terminal side.

Input components of the redirection device and the terminal are different. For example, the input component of the terminal is a touch screen, while the input component of the redirection device is a keyboard and mouse. Therefore, a control instruction triggered by the redirection device through the input component may not be directly recognized by the terminal. In order to ensure that the redirection device reversely control the terminal accurately, in some embodiments, a mapping relationship between the control instructions corresponding different input components is set in the projection application.

Figure 10:
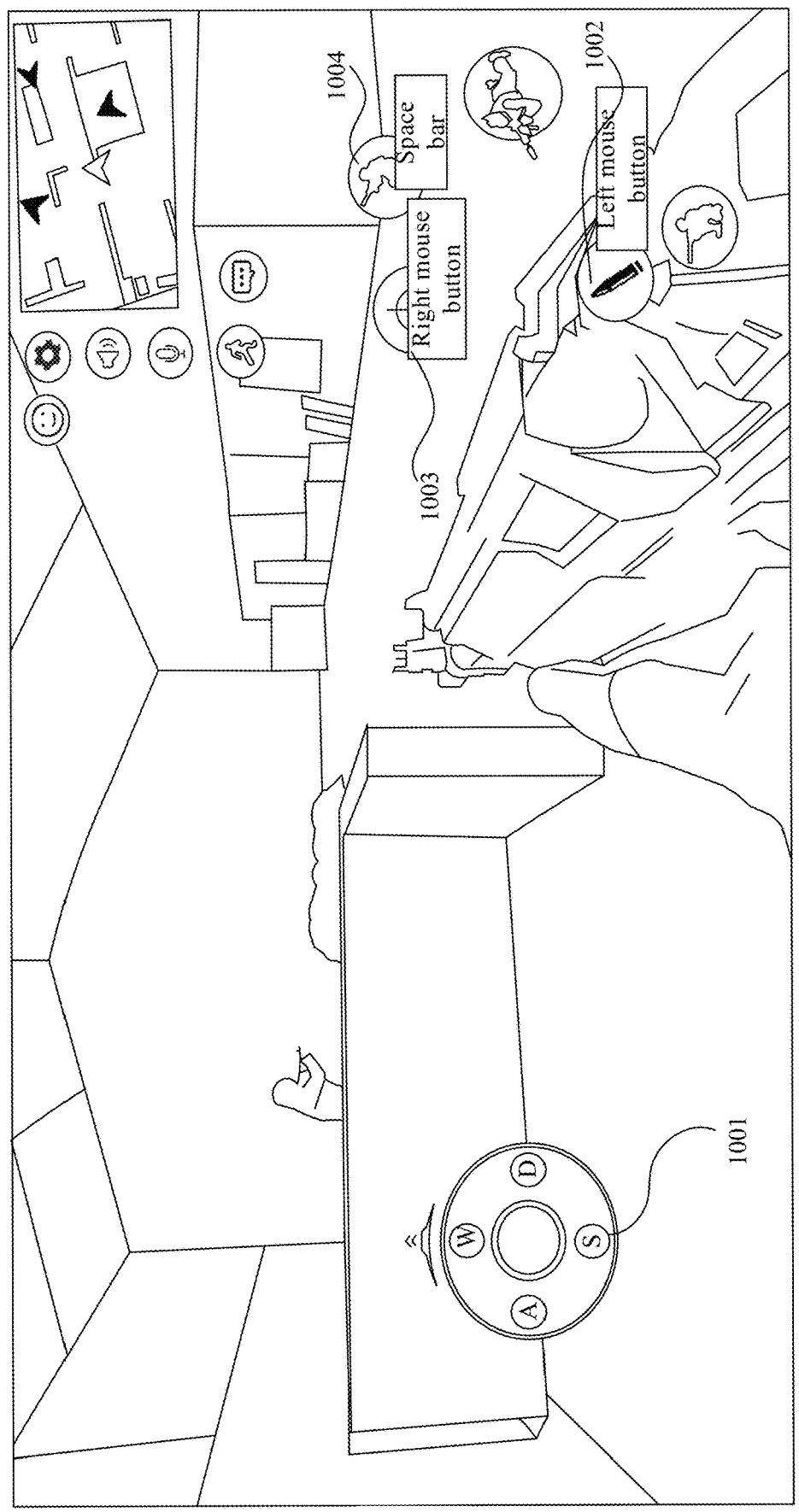
FIG. 10 is a schematic diagram of a mapping relationship between a touch screen and control commands corresponding to a keyboard and a mouse according to some embodiments of the present disclosure.

In some embodiments, FIG. 10 is a schematic diagram of a mapping relationship between a touch screen and control commands corresponding to a keyboard and a mouse according to some embodiments of the present disclosure. A control instruction triggered by a WASD key on the keyboard corresponds to a control instruction triggered when a steering wheel 1001 is dragged, a control instruction triggered by a left mouse button corresponds to a control instruction triggered when a firing control 1002 is clicked, a control instruction triggered by the right mouse button corresponds to a control instruction triggered when a aiming control 1003 is clicked, and a control instruction triggered by the space bar on the keyboard corresponds to a control instruction triggered when a jump control 1004 is clicked.

The mapping relationship may be set by default or the user.

After receiving the control instruction triggered by the input component, the redirection device switch the control instruction into a control instruction recognized by the terminal based on the above mapping relationship, and transmits the switched control instruction to the terminal through the redirection connection, such that the terminal may simulate an effect of manually operating the input component on the terminal side according to the switched control instruction later.

At operation 206, controlling the redirection application based on the first control instruction.

Correspondingly, the terminal reversely controls the redirection application based on the received control instruction, and transmits the changed redirection application interface after the control to the redirection device, such that the user may observe the control effect.

In some embodiments, after the redirection device acquires the control instruction triggered by its own input component, it switches the control instruction into the control instruction recognized by the terminal, and transmits the switched control instruction to the terminal to implement reverse control of the redirection application, thereby overcoming a problem of abnormal reverse control caused by the difference between the input component of the terminal and the input component of the redirection device, and improving an accuracy of the reverse control.

In combination with the above embodiments, compared with the device-level screen projection scheme, the technical effects of the application-level screen projection scheme provided by some embodiments of the present disclosure are shown in Table 1.

TABLE 1

| Key characteristics | Device-level screen projection scheme | Application-level screen projection scheme |
|---|---|---|
| Screen | A resolution of a device image | A resolution of a screen is |

TABLE 1-continued

| Key characteristics | Device-level screen projection scheme | Application-level screen projection scheme |
|---|---|---|
| projection image | is same as that of a terminal, and large black edges are existed. | adapted to a reorientation device, and large black edges are not existed. |
| Privacy | Notification messages outside a redirection application will be displayed on the redirection device. | Notification messages outside a redirection application are only displayed on a terminal. |
| A plurality of applications | An application on a terminal side changes, while an application image displayed on a redirection device side changes synchronously. | A terminal and a redirection device may display different application images at the same time. |
| Power consumption | Screen projection is not supported when a screen of a terminal is turned off, and the power consumption is high. | Screen projection is supported when a screen of a terminal is turned off, and the power consumption is low. |
| Audio | A redirection device plays an mixed audio of a terminal side. | A redirection device only plays an audio of redirection application. |
| Reverse control | Low accuracy | High accuracy |

Figure 11:
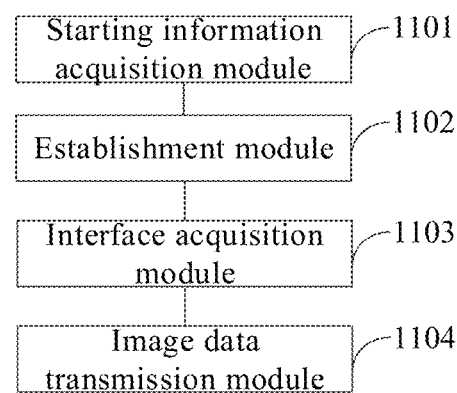
FIG. 11 is a structural block diagram of an apparatus of displaying an application image according to some embodiments of the present disclosure.

As shown in FIG. 11, FIG. 11 is a structural block diagram of an apparatus of displaying an application image according to some embodiments of the present disclosure. The apparatus may be implemented as a whole or part of a terminal through a software, a hardware or a combination of both. The apparatus includes following modules.

The apparatus includes a starting information acquisition module 1101 configured to acquire an application starting information of a redirection application, and the redirection application is an application running in a terminal.

The apparatus includes an establishment module 1102 configured to establish a virtual display for a redirection application based on a target screen resolution of the redirection device, the virtual display has the target screen resolution, and the virtual display is independent of a physical screen of the terminal.

The apparatus includes an interface acquisition module 1103 configured to acquire a redirection application image drawn for the virtual display. The redirection device is a device configured to display the redirection application. The redirection application image is an application image of the redirection application, and a resolution of the redirection application image matches a target screen resolution.

The apparatus includes an image data transmission module 1104 configured to transmit image data of the redirection application image to the redirection device, so that the redirection device may display the redirection application image based on the image data.

In some embodiments, the terminal runs a RedirectionServer.

The establishment module 1102 is configured to: transmit a virtual display establishment request to a DisplayManagerServer through the RedirectionServer, the virtual display establishment request includes the target screen resolution, the DisplayManagerServer is configured to establish the virtual display for the redirection application based on the target screen resolution.

In some embodiments, the apparatus includes an application starting module configured to transmit an activity running message to an ActivityManagerServer by the RedirectionServer. The activity running message includes display information of the virtual display, the ActivityManagerServer is configured to indicate the redirection application to establish a target activity based on the activity running message, the target activity is configured to request a WindowManagerServer to establish a target window, the WindowManagerServer is configured to request to establish a target image layer for the target window, and the target image layer is configured to receive the redirection application image.

The interface acquisition module 1103 is configured to: acquire the redirection application image drawn for the virtual display from the target image layer through the RedirectionServer.

In some embodiments, the redirection application includes candidate image display resources corresponding to at least two candidate screen resolutions.

The apparatus may also include a drawing module.

Before the acquiring a redirection application image drawn for the virtual display, the drawing module is configured to determine a target image display resource matching the target screen resolution through the redirection application, and draw the redirection application image based on the target image display resource.

In some embodiments, the establishment module 1102 is also configured to: establish n virtual displays for n redirection applications based on the target screen resolution in response to existing n redirection applications. The n is an integer greater than 1, and different redirection applications correspond to different virtual displays.

In some embodiments, the starting information acquisition module 1101 includes following.

In some embodiments, the starting information acquisition module 1101 includes a first starting information acquisition unit. The first starting information acquisition unit is configured to: display an application selection interface including at least one candidate application, determine a selected candidate application as the redirection application in response to a selection operation on the application selection interface, and acquire the application starting information of the redirection application.

In some embodiments, the starting information acquisition module 1101 includes a second starting information acquisition unit. The second starting information acquisition unit is configured to receive the application starting request transmitted by the redirection device. The application starting request includes the application starting information of the redirection application, the application starting request is transmitted by the redirection device when the redirection device receives the selection operation on the application selection interface including at least one the candidate application.

In some embodiments, the apparatus also includes a first display module. The first display module is configured to display an application image of an application indicated by an application starting operation on a physical screen in response to the application starting operation outside the application selection interface.

In some embodiments, the apparatus also includes a second display module. After the transmitting image data of the redirection application image to the redirection device, the second display module is configured to display an application notification message on a physical screen in response to receiving the application notification message not corresponding a redirection application.

In some embodiments, the apparatus also includes a first resolution acquisition module. The first resolution acquisition module is configured to: establish a wired redirection connection with the redirection device, and acquire the target screen resolution of the redirection device through the wired redirection connection.

In some embodiments, the apparatus also includes a second resolution acquisition module. The second resolution acquisition module is configured to: acquire a network address of the redirection device, establish a wireless redirection connection with the redirection device based on the network address. and acquiring the target screen resolution of the redirection device through the wireless redirection connection. The terminal and the redirection device access a same network.

In some embodiments, the apparatus also includes an audio acquisition module and an audio data transmission module. The audio acquisition module is configured to acquire audio data of the redirection application. The audio data transmission module is configured to transmit the audio data to the redirection device to enable the redirection device to play an application audio of the redirection application based on the audio data.

In some embodiments, the apparatus also includes a control instruction receiving module and a control module. The control instruction receiving module is configured to receive a first control instruction transmitted by the redirection device. The first control instruction is acquired by the redirection device switching a second control instruction, the second control instruction is an instruction triggered by an input component on the redirection device side, and the first control instruction is used to simulate an instruction triggered by an input component on the terminal side. The control module is configured to control the redirection application based on the first control instruction.

In conclusion, in some embodiments of the present disclosure, when the terminal needs to display the redirection application through the redirection device, based on the target screen resolution of the redirection device, the terminal establishes the virtual display independent of the physical screen for the redirection application and draws the redirection application image matching the target screen resolution for the virtual display, so as to transmit the image data of the redirection application image to the redirection device for display by the redirection device. Compared with the device-level projection scheme in the related art, some embodiments of the present disclosure adopt the application-level projection scheme, which may enable the resolution of the redirection application image to adapt to the resolution of the redirection device to avoid large black edges caused by scaling the image in an equal proportion when the redirection device displays, thereby further improving a display effect of screen projection.

In the above apparatus embodiments, functional implementation process of each module or unit may be referred to the above method embodiments, which will not be repeated here.

Figure 12:
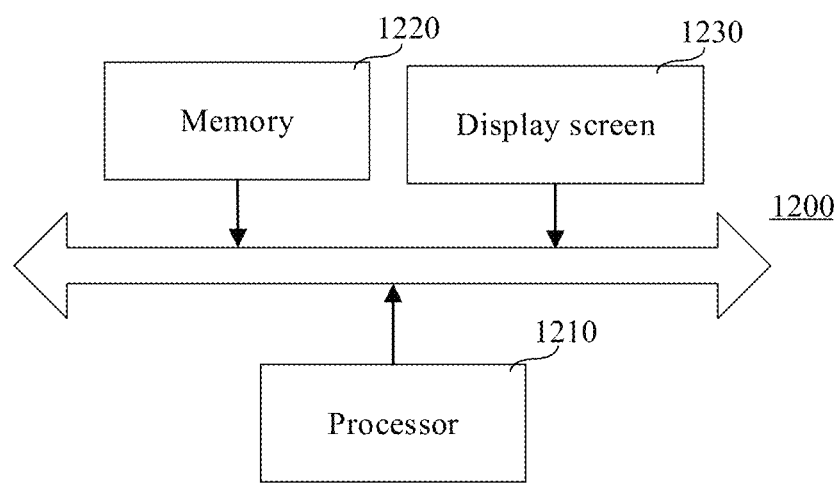
FIG. 12 is a structural block diagram of a terminal according to some embodiments of the present disclosure.

As shown in FIG. 12, FIG. 12 is a structural block diagram of a terminal according to some embodiments of the present disclosure. The terminal 1200 may be a smart phone, a tablet computer, or a personal computer, etc. The terminal 1200 in some embodiments of the present disclosure may include one or more of following components: a processor 1210 and a memory 1220.

The processor 1210 may include one or more processing cores. The processor 1210 uses various interfaces and wires to connect various parts of the entire terminal 1200, and executes various functions and processing data of the terminal 1200 by running or executing instructions, programs, code sets or instruction sets stored in the memory 1220 and calling data stored in the memory 1220. In some embodiments, the processor 1210 may be implemented in at least one hardware form of a digital signal processing (DSP), a field programmable gate array (FPGA), and programmable logic array (PLA). The processor 1210 may integrate one or more combinations of a central processing unit (CPU), a graphics processing unit (GPU), a neural-network processing unit (NPU) and a modem. The CPU is mainly configured to deal with an operating system, a user interface and an application program, etc. The GPU is configured to render and draw content required to be displayed on a display screen. The NPU is configured to implement the function of artificial intelligence (AI). The modem is configured to deal with wireless communication. It may be understood that the above modem may also be implemented by a single chip without being integrated into the processor 1210.

The memory 1220 may include a random access memory (RAM) or a read-only memory (ROM). In some embodiments, the memory 1220 includes a non-transitory computer readable storage medium. The memory 1220 may be configured to store instructions, programs, codes, code sets, or instruction sets. The memory 1220 may include a storage program area and a storage data area. The storage program area may store instructions for implementing the operating system, instructions for at least one function (such as a touch function, a sound playing function, or an image playing function, etc.), and instructions for implementing the above method embodiments, etc. The storage data area may store data (such as audio data, phone book) established according to the use of the terminal 1200.

The terminal 1200 may also include a display screen 1230. In some embodiments of the present disclosure, the display screen 1230 is configured to display an image outside the virtual display, while the image inside the virtual display is displayed by the redirection device. In some embodiments, the display 1230 may also have a touch function to receive and respond to a touch operation of the user.

In some embodiments, the terminal 1200 may also include a communication assembly configured to establish data communication connection with an external device through a wired or a wireless manner. For example, the communication assembly may be a WiFi assembly to establish a wireless redirection connection with the redirection device through the WiFi assembly.

In addition, those skilled may understand that the structure of the terminal 1200 shown in the above drawings does not constitute a definition of the terminal, and the terminal may include more or fewer components than the components shown in the drawings, or combine some components compared with the components shown in the drawings, or have different component arrangements compared with the components shown in the drawings. For example, the terminal 1200 may also include a microphone, a sensor, a camera, a power supply, and other components, which will not be repeated here.

Some embodiments of the present disclosure also provide a screen projection system including a terminal and a redirection device. A redirection connection is established between the terminal and the redirection device, and the redirection connection is configured for data transmission.

The terminal is configured to acquire application starting information of a redirection application. The redirection application is an application running in the terminal.

The terminal is configured to establish a virtual display for the redirection application based on a target screen resolution of the redirection device. The virtual display has the target screen resolution, and the virtual display is independent of a physical screen of the terminal.

The terminal is configured to acquire a redirection application image drawn for the virtual display. The redirection application image is an application image of the redirection application, and a resolution of the redirection application image matches the target screen resolution.

The terminal is configured to transmit image data of the redirection application image to the redirection device.

The redirection device is configured to display the redirection application image based on the image data.

The process of terminal implementing the application-level redirection screen projection may be referred to the above method embodiments, which will not be repeated here.

Some embodiments of the present disclosure also provide a computer-readable medium storing at least one instruction. The instruction is loaded and executed by a processor to implement any one of the methods for displaying an application image described in the above embodiments.

Some embodiments of the present disclosure also provide a computer program product or computer program, which include a computer instruction stored in a non-transitory computer-readable storage medium. A processor of a computer device reads the computer instruction from the computer-readable storage performs any one of the methods for displaying an application image described in the above embodiments.

Those skilled should understand that, in the above one or more examples, functions described in embodiments of the present disclosure may be implemented by a hardware, a software, a firmware or any combination thereof. When implemented by the software, the functions may be stored in a computer-readable medium or transmitted as one or more instructions or code on the computer-readable medium. The computer-readable medium includes a computer storage medium and a communication medium. The communication medium includes any medium that facilitates the transmission of computer programs from one place to another. The storage medium may be any available medium that may be stored and read by a general-purpose computer or a dedicated computer.

The above are only optional embodiments of the present disclosure, and are not intended to limit the present disclosure. Any modification, equivalent replacement, or improvement, etc. within a spirit a principle of the present disclosure should be included in the scope of the present disclosure.

What is claimed is:

1. A method for displaying an application image, performed by a terminal, the method comprising:
acquiring application starting information of a redirection application, the redirection application being an application running in the terminal;
establishing a virtual display for the redirection application based on a target screen resolution of the redirection device, the redirection device being a device configured to display the redirection application, the virtual display having the target screen resolution, and the virtual display being independent of a physical screen of the terminal;
acquiring a redirection application image drawn for the virtual display, the redirection application image being an application image of the redirection application, and a resolution of the redirection application image matching the target screen resolution; and
transmitting image data of the redirection application image to the redirection device to enable the redirection device to display the redirection application image based on the image data,
wherein after the transmitting image data of the redirection application image to the redirection device, the method comprises:
receiving a first control instruction transmitted by the redirection device, the first control instruction being acquired by the redirection device switching a second control instruction, the second control instruction being an instruction triggered by an input component of the redirection device, and the first control instruction being used to simulate an instruction triggered by an input component of the terminal; and
controlling the redirection application based on the first control instruction.

2. The method as claimed in claim 1, wherein the terminal runs a redirection server; the establishing a virtual display for the redirection application based on a target screen resolution of the redirection device comprises:
transmitting a virtual display establishment request to a display manager server through the redirection server, the virtual display establishment request comprising the target screen resolution, the display manager server being configured to establish the virtual display for the redirection application based on the target screen resolution.

3. The method as claimed in claim 2, wherein
after the establishing a virtual display for the redirection application based on a target screen resolution of the redirection device, the method comprises:
transmitting an activity running message to an activity manager server by the redirection server, the activity running message comprising display information of the virtual display, the activity manager server being configured to indicate the redirection application to establish a target activity based on the activity running message, the target activity being configured to request a window manager server to establish a target window, the window manager server being configured to request to establish a target image layer for the target window, and the target image layer being configured to receive the redirection application image;
the acquiring a redirection application image drawn for the virtual display comprises: acquiring the redirection application image drawn for the virtual display from the target image layer through the redirection server.

4. The method as claimed in claim 1, wherein the redirection application comprises candidate image display resources corresponding to at least two candidate screen resolutions;
before the acquiring a redirection application image drawn for the virtual display, the method comprises:
determining a target image display resource matching the target screen resolution through the redirection application, and drawing the redirection application image based on the target image display resource.

5. The method as claimed in claim 1, wherein the establishing a virtual display for the redirection application based on a target screen resolution of the redirection device comprises:
in response to existing n redirection applications, establishing n virtual displays for the n redirection applications based on the target screen resolution, n being an integer greater than 1, and different redirection applications corresponding to different virtual displays.

6. The method as claimed in claim 1, wherein the acquiring application starting information of a redirection application comprises:
    displaying an application selection interface comprising at least one candidate application, determining a selected candidate application as the redirection application in response to a selection operation on the application selection interface, and acquiring the application starting information of the redirection application; or
    receiving an application starting request transmitted by the redirection device, the application starting request comprising the application starting information of the redirection application, the application starting request being transmitted by the redirection device when the redirection device receives a selection operation on an application selection interface, and the application selection interface comprising at least one the candidate application.

7. The method as claimed in claim 6, further comprising:
    displaying an application image of an application indicated by an application starting operation on the physical screen in response to the application starting operation outside the application selection interface.

8. The method as claimed in claim 1, wherein after the transmitting image data of the redirection application image to the redirection device, the method comprises:
    displaying an application notification message on the physical screen in response to receiving the application notification message; wherein the application notification message does not correspond to the redirection application.

9. The method as claimed in claim 1, wherein before the acquiring application starting information of a redirection application, the method comprises:
    establishing a wired redirection connection with the redirection device; and acquiring the target screen resolution of the redirection device through the wired redirection connection; or
    acquiring a network address of the redirection device, the terminal and the redirection device being accessing a same network; establishing a wireless redirection connection with the redirection device based on the network address; and acquiring the target screen resolution of the redirection device through the wireless redirection connection.

10. The method as claimed in claim 1, further comprising:
    acquiring audio data of the redirection application; and
    transmitting the audio data to the redirection device to enable the redirection device to play an application audio of the redirection application based on the audio data.

11. A terminal, comprising:
    a processor; and
    a memory,
    wherein the memory stores at least one instruction used to be executed by the processor to perform a method for displaying an application image, and the method comprising:
    acquiring application starting information of a redirection application, the redirection application being an application running in the terminal;
    establishing a virtual display for the redirection application based on a target screen resolution of the redirection device, the redirection device being a device configured to display the redirection application, the virtual display having the target screen resolution, and the virtual display being independent of a physical screen of the terminal;
    acquiring a redirection application image drawn for the virtual display, the redirection application image being an application image of the redirection application, and a resolution of the redirection application image matching the target screen resolution; and
    transmitting image data of the redirection application image to the redirection device to enable the redirection device to display the redirection application image based on the image data, and
    wherein after the transmitting image data of the redirection application image to the redirection device, the method comprises:
    receiving a first control instruction transmitted by the redirection device, the first control instruction being acquired by the redirection device switching a second control instruction, the second control instruction being an instruction triggered by an input component of the redirection device, and the first control instruction being used to simulate an instruction triggered by an input component of the terminal; and
    controlling the redirection application based on the first control instruction.

12. The terminal as claimed in claim 11, wherein the terminal runs a redirection server;
    the establishing a virtual display for the redirection application based on a target screen resolution of the redirection device comprises:
    transmitting a virtual display establishment request to a display manager server through the redirection server, the virtual display establishment request comprising the target screen resolution, the display manager server being configured to establish the virtual display for the redirection application based on the target screen resolution.

13. The terminal as claimed in claim 12, wherein
    after the establishing a virtual display for the redirection application based on a target screen resolution of the redirection device, the method comprises:
    transmitting an activity running message to an activity manager server by the redirection server, the activity running message comprising display information of the virtual display, the activity manager server being configured to indicate the redirection application to establish a target activity based on the activity running message, the target activity being configured to request a window manager server to establish a target window, the window manager server being configured to request to establish a target image layer for the target window, and the target image layer being configured to receive the redirection application image;
    the acquiring a redirection application image drawn for the virtual display comprises:
    acquiring the redirection application image drawn for the virtual display from the target image layer through the redirection server.

14. The terminal as claimed in claim 11, wherein the redirection application comprises candidate image display resources corresponding to at least two candidate screen resolutions;
    before the acquiring a redirection application image drawn for the virtual display, the method comprises:
    determining a target image display resource matching the target screen resolution through the redirection application, and drawing the redirection application image based on the target image display resource.

15. The terminal as claimed in claim 11, wherein the establishing a virtual display for the redirection application based on a target screen resolution of the redirection device comprises:

in response to existing n redirection applications, establishing n virtual displays for the n redirection applications based on the target screen resolution, n being an integer greater than 1, and different redirection applications corresponding to different virtual displays.

16. The terminal as claimed in claim 11, wherein the acquiring application starting information of a redirection application comprises:

displaying an application selection interface comprising at least one candidate application, determining a selected candidate application as the redirection application in response to a selection operation on the application selection interface, and acquiring the application starting information of the redirection application; or receiving an application starting request transmitted by the redirection device, the application starting request comprising the application starting information of the redirection application, the application starting request being transmitted by the redirection device when the redirection device receives a selection operation on an application selection interface, and the application selection interface comprising at least one the candidate application.

17. The terminal as claimed in claim 16, wherein the method further comprises:

displaying an application image of an application indicated by an application starting operation on the physical screen in response to the application starting operation outside the application selection interface.

18. A non-transitory computer-readable storage medium, storing at least one instruction used to executed by a processor to perform a method for displaying an application image, and the method comprising:

acquiring application starting information of a redirection application, the redirection application being an application running in the terminal;

establishing a virtual display for the redirection application based on a target screen resolution of the redirection device, the redirection device being a device configured to display the redirection application, the virtual display having the target screen resolution, and the virtual display being independent of a physical screen of the terminal;

acquiring a redirection application image drawn for the virtual display, the redirection application image being an application image of the redirection application, and a resolution of the redirection application image matching the target screen resolution; and transmitting image data of the redirection application image to the redirection device to enable the redirection device to display the redirection application image based on the image data, wherein after the transmitting image data of the redirection application image to the redirection device, the method comprises:

receiving a first control instruction transmitted by the redirection device, the first control instruction being acquired by the redirection device switching a second control instruction, the second control instruction being an instruction triggered by an input component of the redirection device, and the first control instruction being used to simulate an instruction triggered by an input component of the terminal; and controlling the redirection application based on the first control instruction.

19. The non-transitory computer-readable storage medium as claimed in claim 18, wherein the terminal runs a redirection server;

the establishing a virtual display for the redirection application based on a target screen resolution of the redirection device comprises:

transmitting a virtual display establishment request to a display manager server through the redirection server, the virtual display establishment request comprising the target screen resolution, the display manager server being configured to establish the virtual display for the redirection application based on the target screen resolution.

* * * * *